US008994880B2

(12) United States Patent
Shintani et al.

(10) Patent No.: US 8,994,880 B2
(45) Date of Patent: Mar. 31, 2015

(54) SYSTEM AND METHODS FOR AUTOMATIC POWER SAVING VIA DEVICE LOCATION IDENTIFICATION

(75) Inventors: Peter Shintani, San Diego, CA (US); Koichi Oshima, Tokyo (JP); Graham Clift, El Cajon, CA (US); Stephane Lejeune, San Diego, CA (US); Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 13/072,435

(22) Filed: Mar. 25, 2011

(65) Prior Publication Data
US 2012/0242906 A1 Sep. 27, 2012

(51) Int. Cl.
*H04N 5/63* (2006.01)
*H04N 21/443* (2011.01)
*G06F 1/32* (2006.01)
*H04N 21/45* (2011.01)

(52) U.S. Cl.
CPC .......... *H04N 21/4436* (2013.01); *G06F 1/3206* (2013.01); *H04N 21/4524* (2013.01); *H04N 5/63* (2013.01)
USPC ........ 348/553; 348/552; 348/730; 455/456.1; 455/574; 700/297; 340/539.23

(58) Field of Classification Search
CPC . H04N 21/4436; H04N 5/63; H04N 21/4524; H02M 2001/0032
USPC .............. 348/730, 553, 552; 455/456.1, 574; 700/297; 340/539.22, 549.23, 539.3
See application file for complete search history.

(56) References Cited

U.S. PATENT DOCUMENTS

| 8,077,032 | B1 * | 12/2011 | Vier et al. ................ 340/539.23 |
| 8,290,513 | B2 * | 10/2012 | Forstall et al. ............ 455/456.3 |
| 2007/0032225 | A1 | 2/2007 | Konicek et al. |
| 2009/0163226 | A1 | 6/2009 | Karkaria et al. |
| 2010/0056181 | A1 | 3/2010 | Rippon et al. |

FOREIGN PATENT DOCUMENTS

CN 101464722 A 6/2009

OTHER PUBLICATIONS

Jin, Z. et al.—"RSSI Based Location-Aware PC Power Management"—SOSP Workshop on Power Aware Computing and Systems (HotPower 09), Oct. 10, 2009, pp. 1-5.

(Continued)

*Primary Examiner* — Jefferey Harold
*Assistant Examiner* — Jean W Desir
(74) *Attorney, Agent, or Firm* — John P. O'Banion

(57) ABSTRACT

A system for automatically setting a power saving mode according to a location of a device, such as a TV. The system includes an interface, e.g. GPS receiver, terrestrial broadcast receiver, network interface, etc. for coupling the device to one or more external devices; a processor; programming executable on said processor for performing the following steps: determining the location of the device via communication with the one or more external devices; establishing a power consumption mode according to the determined location of the device and one or more power consumption regulatory requirements associated with said device location; and adjusting a function of the device to modify the power consumption of the device according to said power consumption mode.

27 Claims, 3 Drawing Sheets

(56) References Cited

OTHER PUBLICATIONS

Brochure for Samsung PS50A650T1 50" Full HD Plasma TV, IT Show 2009, Suntec Singapore, Mar. 2009, pp. 1-6 downloaded from http://nepro.com.sg/productPDF/841.pdf.

Chinese Patent Office, first Office Action issued on Jun. 10, 2014 for corresponding Chinese Patent Application No. 201210036170.6, English translation (pp. 1-9), original Office Action in Chinese (pp. 10-19) and pending claims (pp. 20-22) pp. 1-22.

* cited by examiner

SYSTEM AND METHODS FOR AUTOMATIC POWER SAVING VIA DEVICE LOCATION IDENTIFICATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to system and methods for power saving modes in devices, and more particularly to power saving modes via device location identification.

2. Description of Related Art

Consumers purchasing household appliances are currently being subject to, in an increasing manner, power consumption restriction from varying local, state and federal regulations. However, because power consumption regulations may vary based on the location of the consumer, and generally the consumer will want to have the highest performing specifications for a product according to their location, product manufacturers are faced with having to produce numerous variations of what would have been the same product.

Accordingly, an object of the present invention is to provide a means for identifying the location of an electronic device, and adjust the power consumption of the device accordingly. At least some of these objections will be met in the following description.

BRIEF SUMMARY OF THE INVENTION

The present invention comprises system and methods for automatically adjusting the power consumption of a household appliance, such as a TV or monitor, according to an identified location of the device and corresponding power consumption requirements for the device location.

The system of the present invention is configured to use one or more means of locating a device user's location, e.g. via GPS, transport ID, PSIP data from a content source, EPG setup (zip code) IP address, etc., and then utilize the information to automatically set the product's settings per regulations which may be location dependent.

Another aspect is a method of utilizing device location information such as GPS, transport ID, PSIP data from a content source, EPG setup (zip code) IP address, etc., to automatically enable the power save mode of the television. A home viewer may be precluded to adjust the settings to avoid the false location input, which would override the setting set by regulations.

Alternatively, the device may be configured so that the customer may be able to adjust the locality settings that allow the television work better.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

Many regulatory requirements, such as energy saving modes, are dependent upon location. If a country, state, or other municipality or region requires certain energy saving modes, the system of the present invention provides for automatic setting of the required energy saving mode, based upon acquired location data.

For example, some states, such as California, may have regulations that require additional energy savings compared to the others. Generally, this would require the product to have an additional set up step (which can be manipulated by the user in contradiction to the regulation), or require different versions of the product particular to the region being sold. The systems and methods of the present invention remove the above deficiencies to create devices that are compliant with regulatory requirements, the energy savings mode could be automatically enabled via multiple and also potentially redundant sources of location information.

Figure 1:
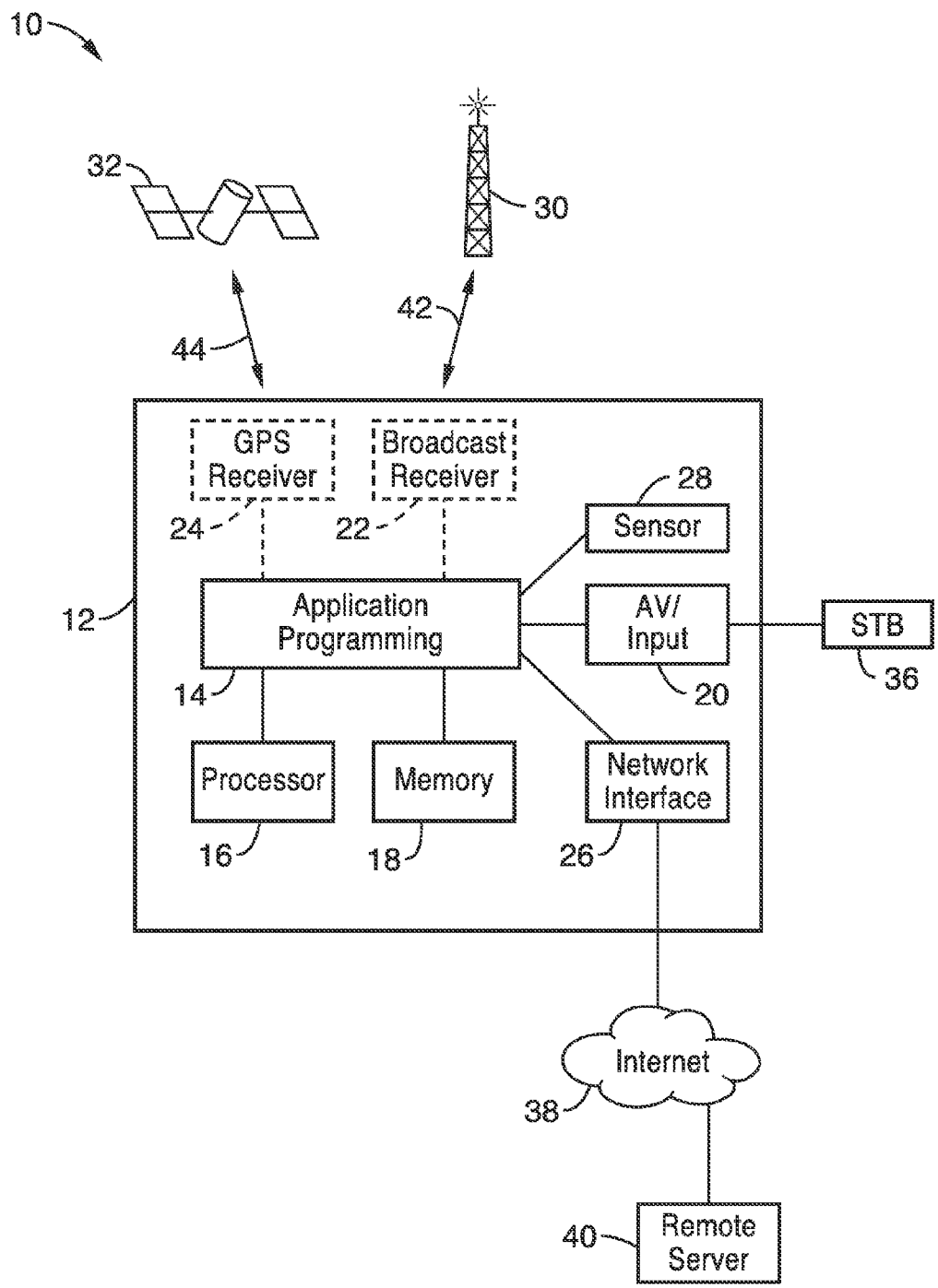
FIG. 1 is a schematic diagram of a system for automatically assigning a device power saving mode by device location in accordance with the present invention.

FIG. 1 is a schematic diagram of a system 10 for automatically assigning a device power saving mode by device location in accordance with the present invention. The system 10 comprises an energy consuming device 12 that may be subject to one or more power consumption regulatory requirements according to the location that the device is operated.

In a preferred embodiment, device 12 comprises a TV, monitor, or like display device. However, it is appreciated that device 12 may comprise any electronic device or appliance that may be subject to power consumption, regulatory requirements. For example, the device 12 may comprise a laptop, tablet, smart phone, portable-TV, refrigerator, dryer, home air-conditioning or heating systems, or like electronic device or appliance. FIGS. 1-4 and the corresponding description below are directed to a TV/monitor or the like device, however, it is appreciated that principles embodied herein are applicable to a number of household appliances and devices.

As illustrated in FIG. 1, device 12 comprises application programming 14 that is stored in memory 18 and executable on processor 16 of the device 12. Application programming 14 is configured to identify the location of the device 12, and apply one or more power saving modes based on the identified location.

Some potential sources of location information that may be acquired by application programming 14 are GPS, transport ID, PSIP data from a content source, or from other set up data that the user enters for other features, such as an EPG. In the case of an Internet-enabled TV, the IP address may provide localization information. Often for an EPG set up, a postal or zip code entry may be used.

To find the device location and/or location specific power consumption regulatory requirements, the device 12 is configured to communicate with a number of external devices. Alternatively, the device 12 could be configured to filter a stream of data delivered via a broadcast, e.g. over satellite, terrestrial, cable, or Internet.

For example, device 12 may comprise a GPS receiver 24 configured to receive transmission 44 from a satellite or GPS satellite network 32 to periodically obtain a GPS location of the device 12.

Device 12 may also comprise an input 20 configured to receive programming/content from set top box (STB) 36 that is configured to receive programming via cable, satellite, terrestrial broadcast or the like. For example, the STB 36 may comprise a cable box that provides Program and System Information Protocol (PSIP) data (i.e. a call signal sent form local stations) that may be used to identify the location of the STB 36.

Device 12 may also comprise a terrestrial broadcast receiver 22 configured to receive terrestrial broadcast transmission 42 from a terrestrial broadcast tower or station 30. The application programming 14 may use data within the terrestrial broadcast signal (e.g. transport ID or other station identification) to provide a location for the device 12. If necessary, the application programming 14 may establish a location of the device by triangulating the location of a plurality of stations.

Device 12 may further comprise a network interface 26 (e.g. Internet enabled TV) configured to couple the device to Internet 38 and one or more remote devices/servers 40. The application programming 14 may use data received from the network connection 38 (e.g. from ISP, IP address, or nodes coupled to the device 12 to access a remote device 40) to provide a location for the device 12.

One or more sensors 28 may also be included to provide data useful in applying a particular power saving mode. For example, ambient light level sensors may be used to determine the lighting in the room to dictate the level of brightness for a TV or monitor display (lower ambient light settings would require less brightness than a highly lit room, and thus draw less power with little loss of performance). Sensor 28 may also comprise a motion sensor 28 to sense inactivity in a room, and turn on/off the device 12 accordingly.

It is appreciated that the device 12 may comprise one or more of the external communication means 20, 22, 24, 26 for redundancy and/or according to the functionality of the device itself (e.g. a refrigerator may only use a GPS receiver, and a laptop or computer monitor may only utilize network interface 26 for acquiring location data).

Figure 2:
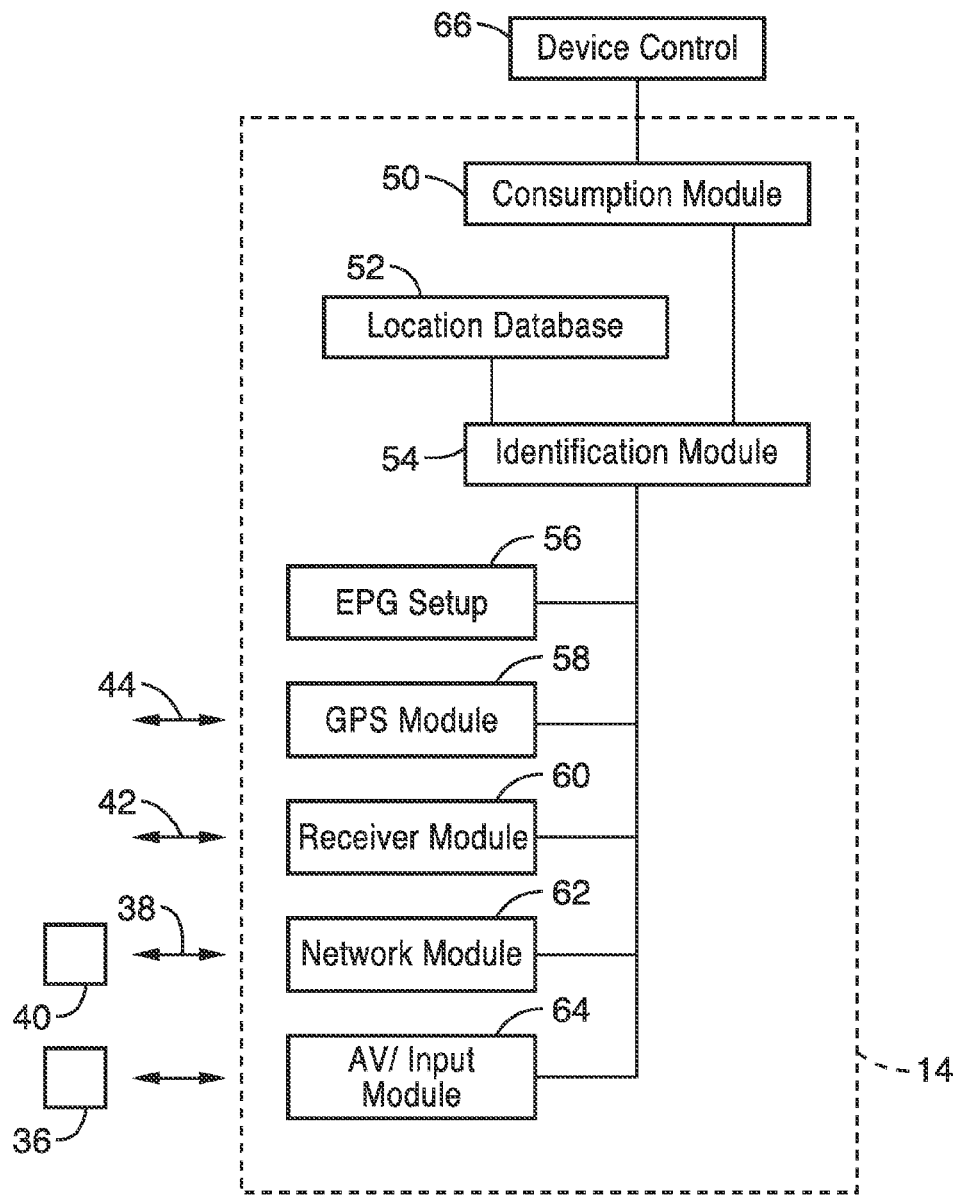
FIG. 2 illustrates a schematic diagram of the device programming of the system of FIG. 1.

FIG. 2 illustrates a detailed schematic diagram of the application programming 14 of system 10. Application programming 14 preferably comprises a power saving/consumption module 50 that uses a provided location from location identification module 54 and location-specific regulatory consumption requirements from database 52 to operate device control 66 to vary power consumption of the device 12 accordingly. For example, for a device 12 comprising a display/monitor/TV, the power saving/consumption module 50 may establish a brightness level to the device controls 66 according to a specified requirement for the locality in which the device 12 was identified to be present.

Such brightness levels (or other power saving techniques) may also be a function of the type of display, or other variables pertaining to the device 12. For example, whether the device 12 is a CRT, LED, LCD, or plasma screen, the time of viewing (e.g. peak vs. off-peak), and the size of the screen, may all factor in the specified power-saving setting that is applied to the device 12. Power saving/consumption module 50 may also take periodic input from sensor 28 in determining the present power saving modes.

For a device 12 comprising an appliance such as a refrigerator, air-conditioning, or central heating unit, etc., power saving may be achieved by setting minimum/maximum temperature settings on the thermostat, which also may be a function of time (e.g. peak, off-peak, etc.).

The identification module 54 may use one or more modules for acquiring location data. For example, GPS module 58 may be used to acquire a GPS location via transmission 44. Receiver module 60 may be used to acquire a location via terrestrial broadcast transmission 42. Network module 62 may be used to acquire a location via Internet 38 and external device 40. AV/input module 64 may be used to acquire a location via set top box 36.

The identification module 54 may also be configured to receive data via an Electronic Programming Guide (EPG) setup 56 for the device 12. For example, the user may be requested to enter in data, e.g. zip code, phone number address, etc. in the EPG setup that helps determine the location of the device 12. However, in some scenarios where the location is set by the user, a false location could be input to override the setting set by regulation. Secondary information from other external devices, could be used to force the settings, and preclude the home viewer from being able to adjust the settings.

Identification module 54 is configured to receive the location data from one ore more external devices coupled to the device 12 via modules 56, 58, 60, 62, and 64, and apply a regulatory power consumption requirement associated with the location data by querying location database 52. While location database 52 is shown locally within device 12 (e.g. in memory 18), it is appreciated that the Identification module 54 may query an external database (e.g. a database stored in external server 40 and acquired through Internet 38). Database 52 may also be periodically updated via an external server 40 and acquired through Internet 38.

Figure 3:
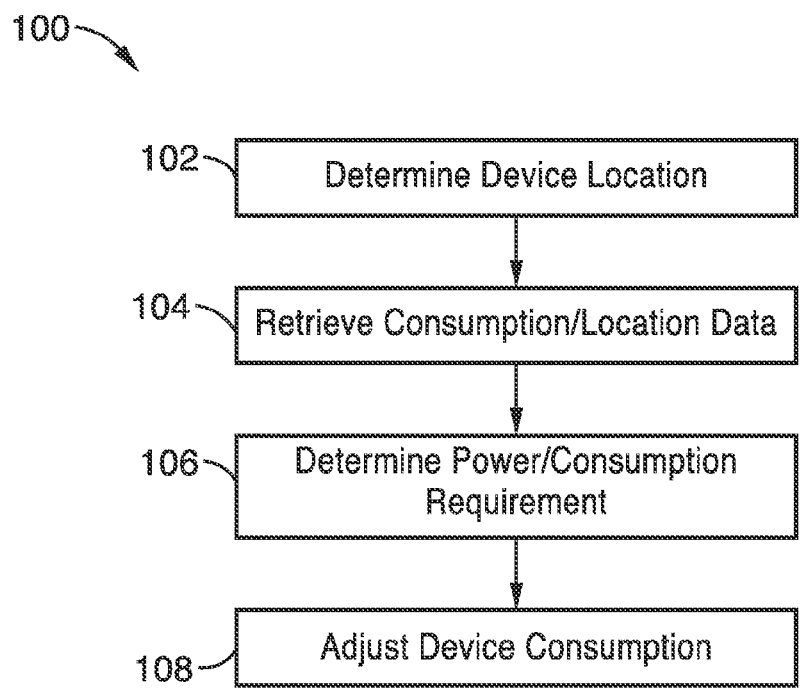
FIG. 3 is a flow diagram of a method for automatically assigning a device power saving mode by device location in accordance with the present invention.

FIG. 3 is a flow diagram of a method 100 for automatically assigning a device power saving mode by device location in accordance with the present invention. At block 102, the device 12 location is determined, e.g. through external communication means 20, 22, 24, 26 and associated external devices. At block 104, consumption data is retrieved, (e.g. via querying database 52) according to the determined device location. Next, a power/consumption mode is determined based on the consumption data at block 106. Finally, the power consumption of the device is adjusted according to the power/consumption mode at block 108.

Figure 4:
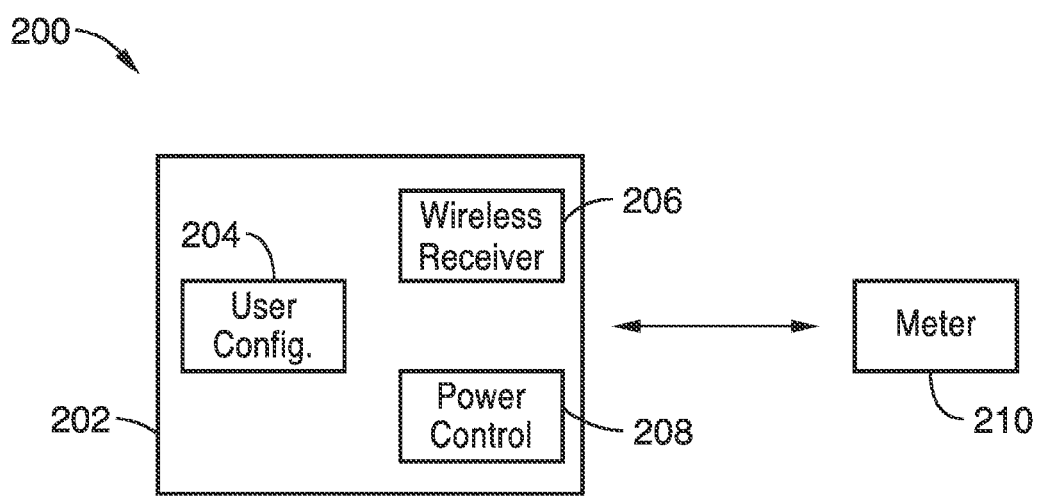
FIG. 4 shows an alternative power saving system configured to operate with a meter in accordance with the present invention.

FIG. 4 shows an alternative power saving system 200 configured to operate with a meter 210 in accordance with the present invention. For example, the meter 210 may comprise a smart meter 210 that is configured to wirelessly communicate real-time energy consumption for a business or dwelling. The device 202 may comprise a wireless receiver 206 configured to receive data from the meter 210, and establish a power saving mode to device control 208, according to the data provided by the meter 210, location data from other external devices (such as those disclosed in FIGS. 1-3), or both. For example, if a particular household is under a certain energy consumption or consumption rate (e.g. because they don't use much gas/electric utilities, or supplement their utilities via solar energy or the like), than the device 202 may establish a less-strict power saving mode compared to a dwelling that has exceeded the threshold. Alternatively, the customer might be able to adjust the settings in the user configuration 204 to be even stricter than those mandated by their locality, so that they may achieve desired energy savings.

The present invention allows a manufacturer to make "one TV" for all markets. The TV will automatically adjust for the local market. There is an assumption that the low energy or restrictive mode does not actually make the TV work better, although the home consumer might like the fact that the TV is low-energy. This might allow modes that are more preferred by the consumer in localities where restrictions are not as strict.

While the above embodiments are primarily directed to the modification of power consumption in a power-saving mode, it is appreciated that the systems and methods of the present invention may also be implemented to vary other functions of the device or appliance in one or more operational modes.

For example, it may be possible in the future for the TV set or appliance to transmit on a wireless frequency, e.g. WIFI, and the particular frequency may differ from country to country. The bands 2.4 GHz and 5.7 GHz are slightly different in different countries and regions of the world. The frequency could automatically be determined through techniques described above.

Another feature could be modification of the frequency for a wireless remote. The TV or other device could be programmed on country location to look for allowed frequency for the particular country.

Furthermore, modulation and frequencies for reception of terrestrial, cable and satellite TV signals may also be modified according to location-dependent operational modes. This would allow a TV to switch modulation from 8 VSB, used in the US, to DVB-T when used in Europe.

In another alternative embodiment, the system and method of the present invention may be used to modify the frequency based on available white space (i.e. frequencies allocated to a broadcasting service but not used locally) to allow for frequency coordination by region.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for automatically setting an operational mode according to a location of a device, comprising: an interface for coupling the device to one or more external devices; a processor; and programming executable on said processor for performing steps comprising: determining the location of the device via communication with the one or more external devices; establishing an operating mode according to the determined location of the device and one or more regulatory requirements associated with said device location; and adjusting a function of the according to said operational mode.

2. The system of embodiment 1: wherein the operational mode comprises a power saving mode; and wherein adjusting a function of the device comprises modifying the power consumption of the device according to a power consumption mode.

3. The system of embodiment 1: wherein the operational mode comprises modification one or more of following: link transmission frequency, remote control reception frequency and modulation, and frequencies for RF reception.

4. The system of embodiment 1: wherein the device comprises a TV having a display; and wherein adjusting a function of the device comprises adjusting a brightness level of the display.

5. The system of embodiment 1, wherein the interface comprises a GPS receiver for obtaining GPS data relating to the device location.

6. The system of embodiment 1, wherein the interface comprises a terrestrial broadcast receiver for obtaining station identification data relating to the device location.

7. The system of embodiment 1, wherein the interface comprises a network interface for obtaining location data relating to the device over the Internet.

8. The system of embodiment 1, wherein the interface comprises an input from a set top box for obtaining PSIP data relating to the device location.

9. The system of embodiment 2: the device further comprising one or more sensors; wherein the one or more sensors provide information relating to the device environment that are used in establishing the power consumption mode.

10. A TV having an automatic power saving mode, comprising: a display; an interface for coupling the TV to one or more external devices; a processor; and programming executable on said processor for performing steps comprising: determining the location of the TV via communication with the one or more external devices; establishing a power consumption mode according to the determined location of the TV and one or more power consumption regulatory requirements associated with said TV location; and adjusting a brightness level of the display to modify the power consumption of the TV according to said power consumption mode.

11. The TV of embodiment 10, wherein the interface comprises a GPS receiver for obtaining GPS data relating to the TV location.

12. The TV of embodiment 10, wherein the interface comprises a terrestrial broadcast receiver for obtaining station identification data relating to the TV location.

13. The TV of embodiment 10, wherein the interface comprises a network interface for obtaining location data relating to the TV over the Internet.

14. The TV of embodiment 10, wherein the interface comprises an input from a set top box for obtaining PSIP data relating to the TV location.

15. The TV of embodiment 10: the TV further comprising one or more sensors; wherein the one or more sensors provide information relating to the TV environment that are used in establishing the power consumption mode.

16. The TV of embodiment 15, wherein the one or more sensors comprise a light sensor.

17. The TV of embodiment 15, wherein the one or more sensors comprise a motion sensor.

18. The TV of embodiment 15, wherein the TV is configured to communicate wirelessly with a utility meter; and wherein data from the utility meter is used in establishing the power consumption mode.

19. A method for automatically setting an operational mode according to a location of a device, comprising: coupling the device to one or more external devices; determining a location of the device via communication with the one or more external devices; establishing an operational mode according to the determined location of the device and one or more regulatory requirements associated with said device location; and adjusting a function of the device according to said power consumption mode.

20. The method of embodiment 19: wherein the operational mode comprises a power saving mode; and wherein adjusting a function of the device comprises modifying the power consumption of the device according to a power consumption mode.

21. The method of embodiment 19: wherein the operational mode comprises modification one or more of following: link transmission frequency, remote control reception frequency and modulation, and frequencies for RF reception.

22. The method of embodiment 19: wherein the device comprises a TV having a display; and wherein adjusting a function of the device comprises adjusting a brightness level of the display.

23. The method of embodiment 19, wherein the interface comprises a GPS receiver for obtaining GPS data relating to the device location.

24. The method of embodiment 19, wherein the interface comprises a terrestrial broadcast receiver for obtaining station identification data relating to the device location.

25. The method of embodiment 19, wherein the interface comprises a terrestrial broadcast receiver for obtaining station identification data relating to the device location.

26. The method of embodiment 19, wherein the interface comprises an input from a set top box for obtaining PSIP data relating to the device location.

27. The method of embodiment 20, further comprising: acquiring data from one or more sensors; said data relating to the device environment; and establishing the power consumption mode based on a function of said acquired data.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for automatically setting an operational mode according to a location of a device, comprising:
an interface for coupling the device to one or more external devices;
a processor; and
programming executable on said processor for performing steps comprising:
determining the location of the device via communication with the one or more external devices;
establishing an operating mode according to the determined location of the device and one or more regulatory requirements associated with said device location;
wherein the one or more regulatory requirements comprise one or more regulations established by a government municipality associated with said location; and
adjusting a function of the device according to said operational mode.

2. A system as recited in claim 1:
wherein the operational mode comprises a power saving mode; and
wherein adjusting a function of the device comprises modifying the power consumption of the device according to a power consumption mode.

3. A system as recited in claim 1:
wherein the operational mode comprises modification one or more of following: link transmission frequency, remote control reception frequency and modulation, and frequencies for RF reception.

4. A system as recited in claim 1:
wherein the device comprises a TV having a display; and
wherein adjusting a function of the device comprises adjusting a brightness level of the display.

5. A system as recited in claim 1, wherein the interface comprises a GPS receiver for obtaining GPS data relating to the device location.

6. A system as recited in claim 1, wherein the interface comprises a terrestrial broadcast receiver for obtaining station identification data relating to the device location.

7. A system as recited in claim 1, wherein the interface comprises a network interface for obtaining location data relating to the device over the Internet.

8. A system as recited in claim 1, wherein the interface comprises an input from a set top box for obtaining PSIP data relating to the device location.

9. A system as recited in claim 2:
the device further comprising one or more sensors;
wherein the one or more sensors provide information relating to the device environment that are used in establishing the power consumption mode.

10. A TV having an automatic power saving mode, comprising:
a display;
an interface for coupling the TV to one or more external devices;
a processor; and
programming executable on said processor for performing steps comprising:
determining the location of the TV via communication with the one or more external devices;
establishing a power consumption mode according to the determined location of the TV and one or more power consumption regulatory requirements associated with said TV location;
wherein the one or more power consumption regulatory requirements comprise one or more regulations established by a government municipality associated with said location; and
adjusting a brightness level of the display to modify the power consumption of the TV according to said power consumption mode.

11. A TV as recited in claim 10, wherein the interface comprises a GPS receiver for obtaining GPS data relating to the TV location.

12. A TV as recited in claim 10, wherein the interface comprises a terrestrial broadcast receiver for obtaining station identification data relating to the TV location.

13. A TV as recited in claim 10, wherein the interface comprises a network interface for obtaining location data relating to the TV over the Internet.

14. A TV as recited in claim 10, wherein the interface comprises an input from a set top box for obtaining PSIP data relating to the TV location.

15. A TV as recited in claim 10:
the TV further comprising one or more sensors;
wherein the one or more sensors provide information relating to the TV environment that are used in establishing the power consumption mode.

16. A TV as recited in claim 15, wherein the one or more sensors comprise a light sensor.

17. A TV as recited in claim 15, wherein the one or more sensors comprise a motion sensor.

18. A TV as recited in claim 15:
wherein the TV is configured to communicate wirelessly with a utility meter; and
wherein data from the utility meter is used in establishing the power consumption mode.

19. A method for automatically setting an operational mode according to a location of a device, comprising:
coupling the device to one or more external devices;
determining a location of the device via communication with the one or more external devices;
establishing an operational mode according to the determined location of the device and one or more regulatory requirements associated with said device location;
wherein the one or more regulatory requirements comprise one or more regulations established by a government municipality associated with said location; and
adjusting a function of the device according to said power consumption mode.

20. A method as recited in claim 19:
wherein the operational mode comprises a power saving mode; and
wherein adjusting a function of the device comprises modifying the power consumption of the device according to a power consumption mode.

21. A method as recited in claim 19:
wherein the operational mode comprises modification one or more of following: link transmission frequency, remote control reception frequency and modulation, and frequencies for RF reception.

22. A method as recited in claim 19:
wherein the device comprises a TV having a display; and
wherein adjusting a function of the device comprises adjusting a brightness level of the display.

23. A method as recited in claim 19, wherein the interface comprises a GPS receiver for obtaining GPS data relating to the device location.

24. A method as recited in claim 19, wherein the interface comprises a terrestrial broadcast receiver for obtaining station identification data relating to the device location.

25. A method as recited in claim 19, wherein the interface comprises a network interface for obtaining location data relating to the device over the Internet.

26. A method as recited in claim 19, wherein the interface comprises an input from a set top box for obtaining PSIP data relating to the device location.

27. A method as recited in claim 20, further comprising:
acquiring data from one or more sensors;
said data relating to the device environment; and
establishing the power consumption mode based on a function of said acquired data.

* * * * *